C. P. STEINMETZ.
PRODUCTION OF AMMONIUM COMPOUNDS.
APPLICATION FILED FEB. 11, 1910.
1,062,805.
Patented May 27, 1913.
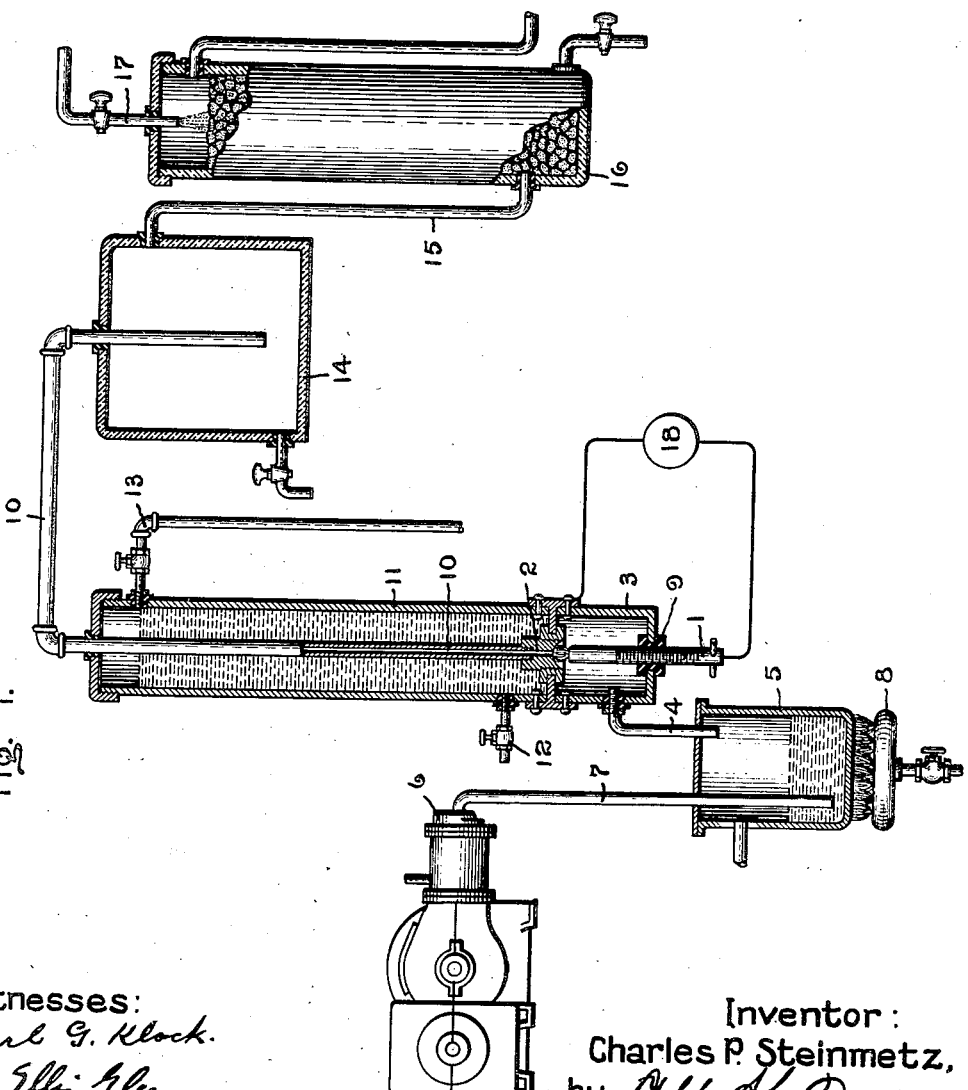
Witnesses:
Earl G. Klock.
J. Ellis Glen.
Inventor:
Charles P. Steinmetz,
by Albert G. Davis
His Attorney.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

PRODUCTION OF AMMONIUM COMPOUNDS.

1,062,805.

Specification of Letters Patent.  Patented May 27, 1913.

Application filed February 11, 1910. Serial No. 543,254.

*To all whom it may concern:*

Be it known that I, CHARLES P. STEINMETZ, a citizen of the United States, residing at Schenectady, in the county of Schenectady, State of New York, have invented certain new and useful Improvements in the Production of Ammonium Compounds, of which the following is a specification.

My invention relates to the production of chemical reactions in gaseous mixtures by means of an electric arc, and it comprises a process of making ammonium compounds by subjecting a gaseous mixture containing aqueous vapor and nitrogen to the action of the arc. I have discovered that if a mixture of this kind, for example, a mixture of air and steam is acted upon by the arc, the nitrite and nitrate of ammonium are formed. Apparently the watery vapor is dissociated, and the free hydrogen and oxygen unite with the nitrogen to form ammonia and nitrous and nitric acids, and the ammonia and the acids combine to form the above compounds. The proportion of nitrate to nitrite varies with the relative amount of oxygen, and the length of time the oxygen is in contact with the nitrous oxid or the ammonium nitrite which are formed. An excess of acid, or ammonia, is absorbed in suitable towers.

The accompanying drawings show suitable forms of apparatus for carrying out my invention, but this apparatus is not a part of the present invention.

Figure 1 shows somewhat diagrammatically an apparatus for mixing the air with steam and condensing the reaction products; and Fig. 2 is a fragmental view, showing a somewhat modified means of cooling the reaction product.

Referring to Fig. 1, an arc is formed between the adjustable cathode 1 and perforated anode 2. The arc is surrounded by a pressure chamber 3, which communicates with a supply tube 4. The supply tube communicates with a closed tank 5 partly filled with water. The air, or nitrogen, is furnished by a blower 6, which communicates with the tank 5 by means of a tube 7 dipping beneath the surface of the water in a tank 5. The water in tank 5 is heated to a suitable temperature by means of a gas burner 8, thus regulating the amount of watery vapor carried over into the arc.

The cathode 1 is insulated from a pressure chamber 3 by means of a suitable bushing 9. The anode 2 communicates with a tube 10, which is surrounded by a water jacket 11, or other suitable cooling means. The circulation of water in the jacket 11 is maintained through inlet pipe 12 and outlet pipe 13. The tube 10 passes into a chamber 14, the purpose of which will be hereinafter explained. This chamber 14 communicates by means of pipe 15 with an absorbing tank 16. Only one absorbing tank has been shown for the purpose of illustration; but others may be added if necessary. The absorbing tank is filled with some vitreous material, such as broken stoneware, over which a film of moisture is maintained by water supplied through a pipe 17. If desired, this tank may be filled with some material, such as lime, with which any acid, if in excess, can combine. Electrodes 1 and 2 are connected to a suitable source of current 18.

In the form of apparatus described by me, the interaction between air and the aqueous vapor, or between nitrogen and aqueous vapor proceeds as follows: The air, or nitrogen, supplied at the desired rate by a pump 6 carries with it a certain amount of steam from the tank 5, the amount of steam depending upon the temperature of the water. The mixture of air and steam passes into the pressure chamber 3, and from thence is forced through an arc formed between electrodes 1 and 2. The products of the reaction are cooled below the temperature at which the reverse reaction can take place by contact with the cooled walls of the tube 10. In the reaction chamber 14 oxygen combines with the nitric oxid to form nitric dioxid, which with water gives nitric and nitrous acids. These acids in turn combine with ammonia to form ammonium nitrate and nitrite. Some of the ammonium nitrite formed by a combination of the ammonia and the nitrous acid in the tube 10 and in the chamber 14 is oxidized to form ammonium nitrate. The unacted upon watery vapor is condensed in the chamber 14, forming therein a strong solution of ammonium nitrate associated with a certain amount of ammonium nitrite. The uncombined nitric and nitrous acids, or ammonia, as the case may be, pass over into the absorption tank 16, where they are either dissolved in water to form nitric and nitrous acids, or ammonium hydrate, as the case may be. Uncombined acids combine with the lime, or other reaction material, to form nitrate or nitrite of calcium, or of other metal.

In the modified form of apparatus illustrated by Fig. 2, the reaction products are conducted through a short tube 2, which serves also as anode into a body of water contained in the tank 19. The tubes 20 and 21 serve to renew the water in the tank 19. The water-cooled condenser 22 projecting into the tank 19 serves to condense and return that portion of the water which is vaporized by the heating action of the reaction products from the arc. In this form of apparatus the mixture of the air and steam supplied in a manner similar to that described in connection with Fig. 1, is forced through the arc, where ammonia and nitrous acid are formed. These products condense and combine to a large extent when bubbling through the water with the formation of a solution of ammonium nitrite. As the solution of ammonium nitrite cannot be evaporated to dryness without the dissociation of the nitrite, the solution is continually drawn off through the pipe 21, and can be used as a fertilizer, or it may be oxidized to nitrate. Fresh water is supplied by the tube 20. The excess of nitrous acid passes on through the tube 23 into a reaction chamber and absorbing tank similar to that shown in Fig. 1. The nitrous acid is oxidized in large part to nitric acid in the reaction chamber, and the mixture of nitrous and nitric acid, or uncombined ammonia, are absorbed as already described in connection with Fig. 1.

What I claim as new and desire to secure by Letters Patent of the United States, is—

1. The process of making ammonium compounds of a nitrogen acid which consists in passing a gaseous mixture containing watery vapor and nitrogen through an electric arc and withdrawing the resulting reaction products immediately into a space maintained below their dissociating temperature.

2. The process of making ammonium compounds, which consists in passing a mixture of air and aqueous vapor through an electric arc and immediately cooling the reaction products below their dissociating temperature.

3. The process of making ammonium compounds, which consists in urging a mixture of nitrogen, oxygen and aqueous vapor through an electric arc, and cooling the products of the resulting reaction below their dissociating temperature.

4. The process of making ammonium compounds which consists in passing a gaseous mixture containing oxygen, nitrogen and watery vapor through an electric arc and withdrawing the products of the resulting reaction into a space maintained below the dissociating temperature of the reaction products.

In witness whereof, I have hereunto set my hand this 9th day of February, 1910.

CHARLES P. STEINMETZ.

Witnesses:
BENJAMIN B. HULL,
HELEN ORFORD.